United States Patent [19]

Abe et al.

[11] Patent Number: 4,524,388

[45] Date of Patent: Jun. 18, 1985

[54] SHADING CORRECTION DEVICE

[75] Inventors: Yoshinori Abe; Masahiko Matsunawa, both of Tokyo, Japan

[73] Assignee: Konishiroku Photo Industry Co., Ltd., Tokyo, Japan

[21] Appl. No.: 406,078

[22] Filed: Aug. 6, 1982

[30] Foreign Application Priority Data

Aug. 11, 1981 [JP] Japan .................................. 56-124791
Jun. 22, 1982 [JP] Japan .................................. 57-107040
Jun. 22, 1982 [JP] Japan .................................. 57-107041

[51] Int. Cl.³ ............................................. H04N 5/34
[52] U.S. Cl. .................................................. 358/163
[58] Field of Search ......................................... 358/163

[56] References Cited

U.S. PATENT DOCUMENTS 3,902,011  8/1975  Pieters et al. ........................ 358/163
4,200,934  4/1980  Hofmann ............................. 358/163
4,237,488  12/1980  Takemura ........................... 358/163
4,354,243  10/1982  Ryan et al. .......................... 358/163
4,377,820  3/1983  Reitmeier ............................ 358/163

Primary Examiner—Richard Murray
Attorney, Agent, or Firm—James E. Nilles; Thomas F. Kirby

[57] ABSTRACT

A shading correction device wherein in advance to the reading of the document image, shading correction coefficients are obtained from optic information from uniform reflecting surface and stored in a memory element such as RAM, and correcting the picture signal in accordance with the content of the memory element when the document is read.

5 Claims, 18 Drawing Figures

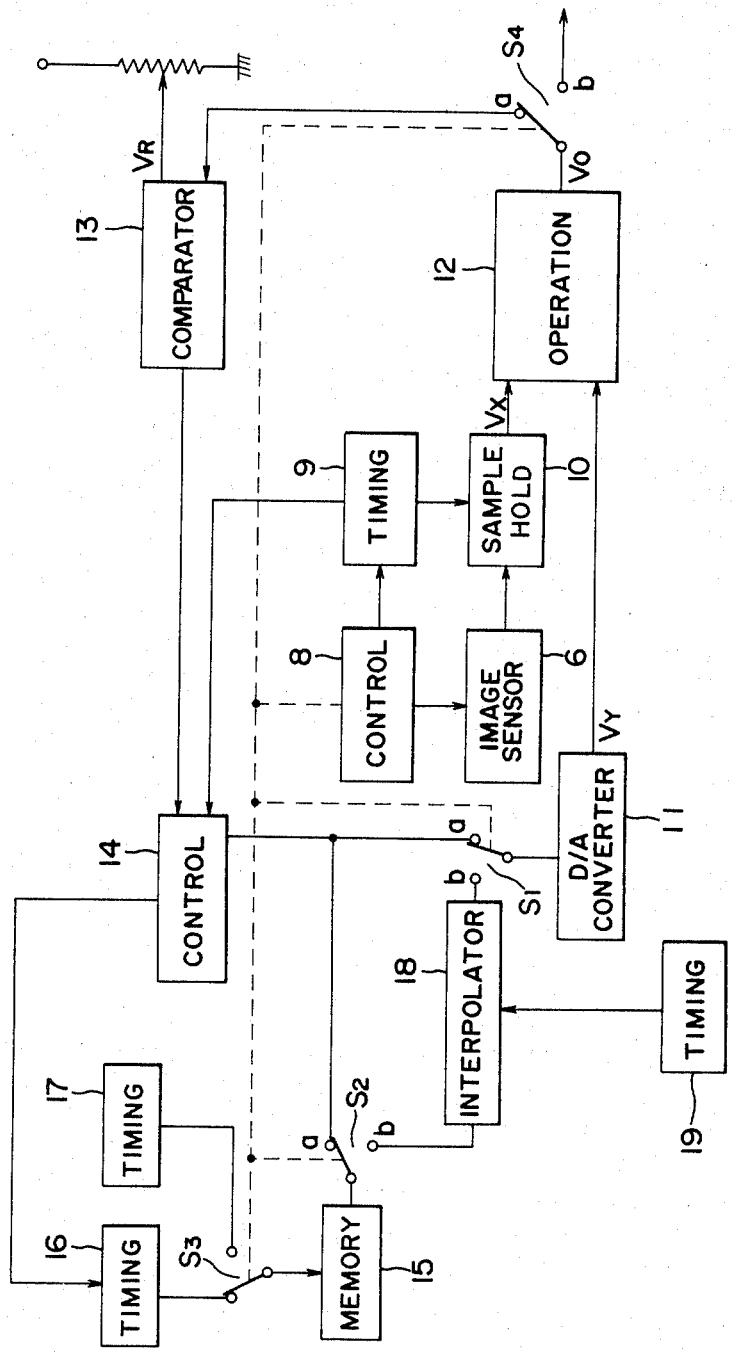
F I G. 5

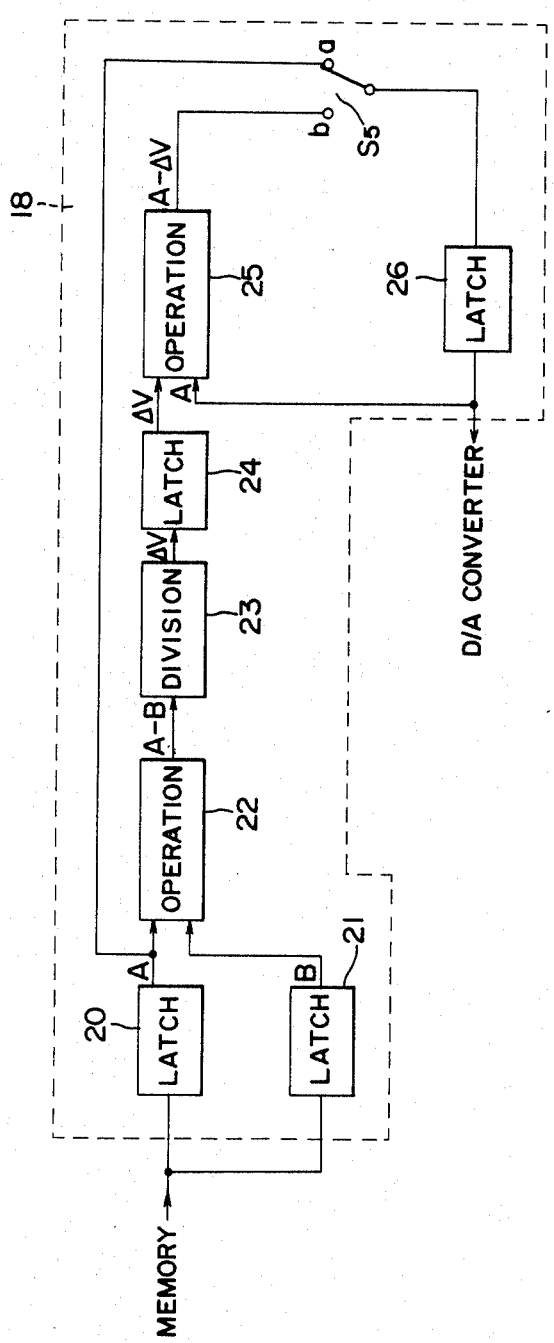
F I G. 8

| 0 | 8 | 2 | 10 |
|---|---|---|----|
| 12 | 4 | 14 | 6 |
| 3 | 11 | 1 | 9 |
| 15 | 7 | 13 | 5 |

SHADING CORRECTION DEVICE

BACKGROUND OF THE INVENTION

1. Field of the Invention

The present invention broadly relates to an equipment such as reproducing apparatus, facsimile and the like having a document reading apparatus incorporating a photoelectric conversion element and, more particularly, to a shading correction device for use in the document reading apparatus in equipments of the type mentioned above.

2. Description of the Prior Art:

Such a recording device has been known and used broadly as having a lamp for illuminating a document, an optical system including a reflecting mirror and lenses, photoelectric conversion element such as a solid state image sensor or photodiode array to which the light reflected by the document is applied through the optical system to form an image, a stylus electrode or the like by which an electrostatic latent image is formed in accordance with the electric signal derived from the image sensor and means for developing the electrostatic latent image to record the image.

In this type of recording apparatus, the output from the image sensor is often made non-uniform even when the density of the document surface is uniform. Particularly, the output at the marginal edge portions becomes lower than that at the central region. The reproduced image is darkened in the area of lower output to make the density of the reproduced image non-uniform. This phenomenon, generally referred to as "shading" is attributable to the following reasons.

(a) Uneven illumination and illumination fluctuation of the lamp for illuminating document.

A fluorescent lamp, for example, is used as the lamp for illuminating the document. Partly because the lamp has a definite length and partly because the intensity of light is lower at both ends than at the central portion due to the peculiar light-emitting mechanism. In addition, the fluorescent lamp is gradually darkened at both ends thereof during long use. Furthermore, the illumination distribution is varied depending on the manner of mounting of the lamp.

(b) Loss of light in lenses of optical system

The quantity of light transmitted through a lens is lowered at the peripheral part of the lens in accordance with the cosine biquadratic law. For instance, the quantity of light at the peripheral portion of the lens is as small as 78% when the image half angle is 20°.

(c) Lack of uniformity in sensitivity of image sensor

Due to reasons concerning fabrication or production, the image sensor such as the solid state image sensor, e.g. charge coupled device (CCD), and diode array often lack uniformity of sensitivity.

Various countermeasures have been taken hitherto in order to correct the shading. For instance, it has been proposed to use a light disbribution board to reduce the intensity of light at the central portion of the lamp to the same level as that in the end regions thereby to uniformalize the intensity distribution over the entire length of the lamp. This countermeasure, however, is quite invalid against the blackening of the lamp at both end regions, although it is effective in the initial state of use. In order to compensate for the change in the intensity distribution due to blackening, it is necessary to frequently readjust the light distribution board.

It is also proposed, in order to accurately effect the correction, to place an image sensor which outputs the shading waveform in addition to the image sensor for reading the document and to make operation for combining the image signal picked up from the document and the shading waveform. This countermeasure is also unsatisfactory because it cannot make compensation for the fluctuation attributable to the lack of uniformity in sensitivity of the photoelectric element or change in the sensitivity attributable to a change in the ambient temperature, although it can effectively be used for the correction of shading caused by the light source.

Still another correction method employs the steps of illuminating a surface at a uniform illumination, making a photoelectric conversion of the light signal from the surface, conducting an A/D conversion to convert the analog electric signal to digital signal, storing the digital signal in a memory element, and reading the document while correcting the shading by the content of the memory. This method can provide a considerably high accuracy of correction. However, the conversion time of the A/D converter becomes shorter as the driving frequency of the image sensor becomes higher. Thus, ordinary A/D converters cannot satisfactorily cope with the demand for high-speed reading. In addition, it is necessary to employ memory element having larger capacity as the number of picture images is increased.

SUMMARY OF THE INVENTION

Under this circumstance, the present invention aims at providing a shading correction device in which, in advance to the reading of the document image, shading correction coefficients are obtained from optic information from uniform reflecting surface and stored in a memory element such as RAM, and correcting the picture signal in accordance with the content of the memory element when the document is read. According to this arrangement, it is possible to effectively correct the shading attributable to a fluctuation in the light distribution characteristics of the lamp due to secular change or temperature change, as well as the shading attributable to the lack of uniformity in sensitivity of the image sensor. In order to determine the shading correction coefficients and to store the same in the memory element, it is necessary to employ a processing circuit operable at an extremely high speed, as well as a memory element having a high reading speed and large capacity. Such processing circuit and memory element are generally expensive. In addition, the access time is too long to achieve a high-speed reading.

Therefore, according to the invention, the determination of the correction coefficients is made with reduced number of samples and during the outputting, the correction coefficients in the non-sampling period are determined by an interpolator. In addition, during outputting of the correction coefficients, operation is made to determine the next correction coefficient. By making this parallel processing, it is possible to comply with the request for the high-speed reading. A higher accuracy of the correction can be achieved by varying the number of the samples for different regions in accordance with the shading characteristics.

In order to improve the resolution in the reading, it has been proposed to use an image pickup device composed of a plurality of image-forming lenses and images sensors, and a reading device adapted to compose the outputs from the photoelectric conversion elements. In the apparatus incorporating such image pickup device and reading device, due to the cosine biquadratic law of the image forming lens, a shading waveform as shown by curve (a) in FIG. 1 is obtained when two image sensors are used. It will be seen that discontinuity of the shading waveform is generated at the point of composition. Therefore, the aforementioned correction method in which the shading correction coefficients are determined for sampling picture elements from the sample values and correction coefficients for the non-sampled picture elements are determined during the correction encounters the following problem.

Namely, the shading correction coefficients for the picture elements in the vicinity of the composition point (seam), which are obtained through interpolator as shown by broken-line curve (b), largely differ from the ideal correction coefficients which are shown by solid line curve (c).

This problem would be overcome by arranging such that the shading correction is made for each image sensor to uniformalize the level before the composition. This method, however, requires two correction devices, resulting in a raised cost of the apparatus.

Accordingly, another object of the invention is to provide a shading correction device in which picture elements in the points of composition of a plurality of image sensors or the picture elements in the vicinity of such points are selected as the sample picture elements so that correct shading correction coefficients are obtained even in the point of composition (seam).

The aforementioned method in which the shading waveforms of all picture elements are subjected to A/D conversion to effect the correction. This method, however, cannot cope with the demand for high-speed reading as stated before. In another method, an abnormal picture element is corrected by an interpolator conducted with the signals obtained from adjacent picture elements. This method is also impractical because it requires a complicated circuit and a long processing time.

Accordingly, still another object of the invention is to provide a shading correction device having the following functions of: determining the shading correction coefficients for sample picture elements through a first scanning of a reflecting surface; effecting a second scanning of the reflecting surface to obtain outputs from image sensors; correcting the outputs by means of shading correction coefficients for the used picture elements determined by an interpolator; detecting the position of any abnormal picture elements through comparison between the corrected signals and a predetermined reference voltage; determining the shading coefficients separately for the abnormal picture elements; and applying the shading correction coefficients for abnormal picture elements in the reading. According to this arrangement, it is possible to conduct the interpolator at a high speed even if the image sensor having abnormal picture element is involved.

These and other objects, features and advantages of the invention will become clear from the following description of the preferred embodiments taken in conjunction with the accompanying drawings.

BRIEF DESCRIPTION OF THE DRAWINGS

FIG. 5 is a circuit diagram of a shading correction device in accordance with the present invention, incorporated in a document reading apparatus;

FIG. 8 is an illustration of an example of an interporator circuit in the shading correction device shown in FIG. 5;

DESCRIPTION OF THE PREFERRED EMBODIMENTS

Figure 2:
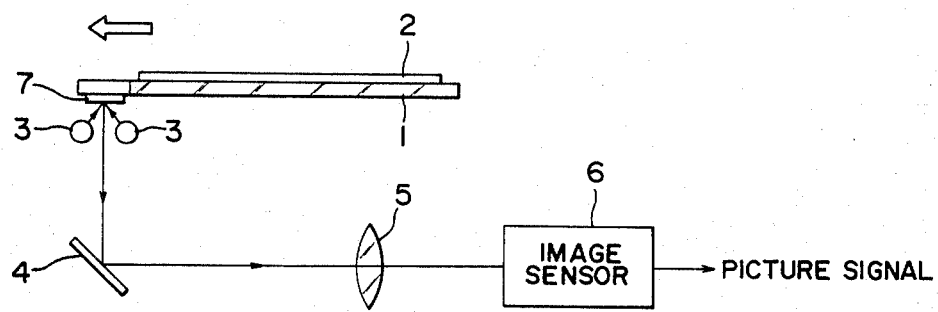
FIG. 2 is a schematic illustration of a part of a document reading device of a reproducing apparatus.

FIG. 2 shows a reproducing apparatus having a document reading apparatus of a movable document table type. In this reproducing apparatus, a document 2 placed on a document glass plate 1 is illustrated by lamps 3, and the light reflected by the document is conducted to an image sensor 6 through a mirror 4 and a lens 5. The light signal is then converted into an electric picture signal by means of the image sensor 6. In this embodiment, a white blank constituting a reflecting surface 7 is provided in a non-image forming region ahead of the document glass plate.

Figure 3:
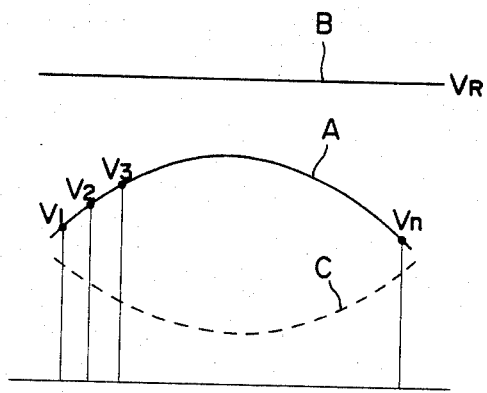
FIG. 3 is an illustration of shading waveforms and shading correction coefficients.

As the document glass plate 1 is moved in the direction of arrow during reading of the document, a signal of waveform as shown by a curve A in FIG. 3 is obtained from the image sensor 6 by the light reflected from the reflecting surface 7 by one scanning. This curve shows a shading waveform of the reading apparatus as a whole. In general, the image sensor is composed of n pels (n) pieces of unit elements). Therefore, the shading waveform is composed of minute units $V_1$, $V_2$ ... $V_n$.

An explanation will be made here as to the method of determining the correction coefficient for correcting the shading.

As shown in FIG. 3, a reference voltage $V_R$ (shown by straight line B) is optionally set with respect to the shading waveform. Values as shown by broken-line curve C are obtained by dividing the reference voltage $V_R$ by the output voltages $V_1$ to $V_n$. The values shown in the curve C are stored in a memory device such as RAM, as the shading correction coefficients. Representing the driving frequency of the image sensor by (f), if the shading correction coefficients are to be obtained from the picture element signals from the white reflecting surface 7, it is necessary that the processing time per picture element is smaller than 1/f. For instance, assuming that the driving frequency (f) is 2 MHz, it is necessary to determine the shading correction coefficient in quite a short time of 0.5 µs. This in turn requires a processing circuit of an extremely high processing speed. Insteadly of determining the correction coefficients for all picture elements, it is proposed to determine the shading correction coefficients for sample picture elements which are selected at a predetermined sampling pitch N. By so doing, it is possible to increase the required processing time to N×1/f and, hence, to achieve a higher speed of reading as compared with the method in which correction coefficients are obtained for all picture elements.

As will be seen from FIG. 3, the shading waveform make large change at both end portions and a small change at the central region, so that a more accurate correction is achievable by adopting a smaller sampling pitch at both end regions than at the central region. The shading coefficients in the non-sampling period are determined by interpolator.

Figure 4:
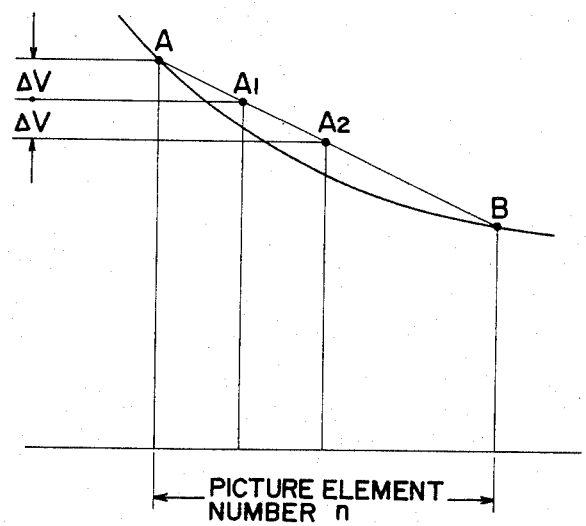
FIG. 4 is an illustration of interpolator method in accordance with the present invention.

Referring to FIG. 4, representing the shading correction coefficients determined through sampling by A and B are representing the number of picture elements therebetween by (n), the variation $\Delta V$ of the shading correction coefficient between adjacent picture elements is expressed as follows:

$$\Delta V = \frac{A - B}{n + 1} \quad n: \text{number of picture elements}$$

FIG. 4 exemplarily shows the case where the number (n) is 2. Namely, there are two picture elements $A_1$ and $A_2$ between two sampled picture elements. Therefore, the shading correction coefficients $A_1$ and $A_2$ are obtained as follows:

$$A_1 = A - \Delta V$$

$$A_2 = A_1 - \Delta V = A - 2\Delta V$$

The division operation for determining the variation $\Delta V$ takes much longer time than the subtracting operation for obtaining the values $A_1$ and $A_2$. Therefore, the processing time in the interpolator circuit is ruled almost by the time length required for the division operation. This goes quite contrary to the demand for the high-speed operation.

According to the invention, therefore, the variation $\Delta V$ in the next sampling is determined during the calculation of the coefficients $A_1$ and $A_2$. By this parallel processing, the time length required for the processing in the interpolator circuit as a whole is reduced remarkably.

A shading correction device in accordance with an embodiment of the invention will be explained hereinunder with reference to FIG. 5.

Referring to FIG. 5, a control circuit 8 is adapted to produce a driving clock for driving the image sensor 6, as well as signals for starting and stopping the photoelectric conversion. A sample hold timing circuit 9 is adapted to produce a signal for varying the sampling density or pitch on the white reflecting surface 7 in accordance with the driving clock for the image sensor delivered by the control circuit 8. A reference numeral 10 denotes a sample hold circuit which is adapted to hold, only in the period in which the correction coefficients are calculated in accordance with the timing signal from the sample hold timing circuit 9, the picture signal which is obtained through a photoelectric conversion conducted by the image sensor 6. A reference numeral 11 designates a D/A converter adapted to effect a digital to analog conversion of the shading correction coefficients. An operation circuit 12 is adapted to make an arithmetic operation using the picture signal $V_X$ and the shading correction coefficient $V_Y$ delivered by the D/A converter 11. A comparator 13 is adapted to make a comparison between the reference voltage $V_R$ and the signal $V_0$ obtained through the operation made by the operation circuit 12 and to produce an output H (High) level or L (Low) level in accordance with the result of the comparison. A reference numeral 14 designates a control circuit which is adapted to be started by the sample hold timing circuit 9 and to successively turn on the analog switches of the D/A converter from the upper bit (MSB). The control circuit 14 makes a control as to whether the switch is to be kept on or turned off to proceed the process to the next switch, in accordance with the output from the comparator 13. A memory circuit 15 such as a RAM is adapted to store the status of switches of the D/A converter controlled by the control circuit 14. A timing circuit 16 is adapted to produce a timing signal representing the timing of writing of the status of the switches of the D/A converter 11, i.e. the timing at which the shading correction coefficient is to be written in the memory circuit 15. A timing circuit 17 is adapted for reading the shading correction coefficient from the memory circuit 15. A reference numeral 18 denotes an interpolator circuit adapted to conduct an interpolator operation in accordance with the sampling density at which the shading correction coefficients read out from the memory circuit 15 are obtained thereby to determine the correction coefficients of the picture elements between two adjacent sampled picture elements. An interpolator timing circuit produces a timing signal for the interporator operation performed by the interpolator circuit 18. Switches $S_1$, $S_2$, $S_3$ and $S_4$ have contacts (a) and contacts (b). These switches are turned on to connect to contacts (a) during memorizing of the shading correction coefficients and to connects to the contacts (b) when the document is read. The switching is made by a switching signal delivered by the control circuit 8.

Figure 6:
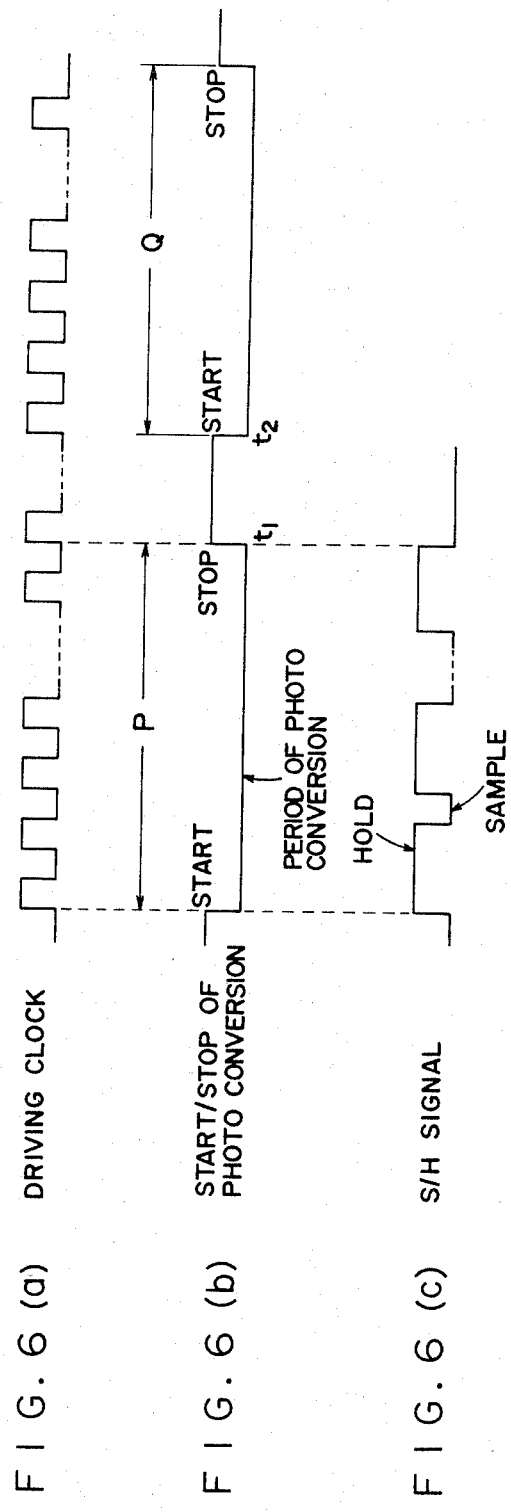
FIGS. 6a to 6c and FIG. 7 are signal waveform charts of signals available at different essential points in the shading correction device shown in FIG. 5.

Hereinafter, an explanation will be made as to the memorizing operation of the shading correction coefficients. For the memorization of the shading correction coefficients, the switches $S_1$ to $S_4$ have been turned to connect to the contacts (a). The sample hold timing circuit 9 produces a sample hold signal as shown in FIG. 6c, in accordance with the driving clock (FIG. 6a) for the image sensor 6 issued by the control circuit 8 and the start/stop signal (FIG. 6b) for starting or stopping the photoelectric conversion. In FIG. 6b, the section P represents the period for memorizing the shading correction coefficients while the section Q represents the period for reading the document. In the sample hold circuit 10, the output from the image sensor 6, i.e. the shading waveform obtained through the photoelectric conversion of the white reflecting surface 7 is sampled when the sample hold signal takes the L level and is held when the same takes the H level. The sampling time delivered to the operation circuit 12, holding time and the sampling density are set as desired.

Figure 7:
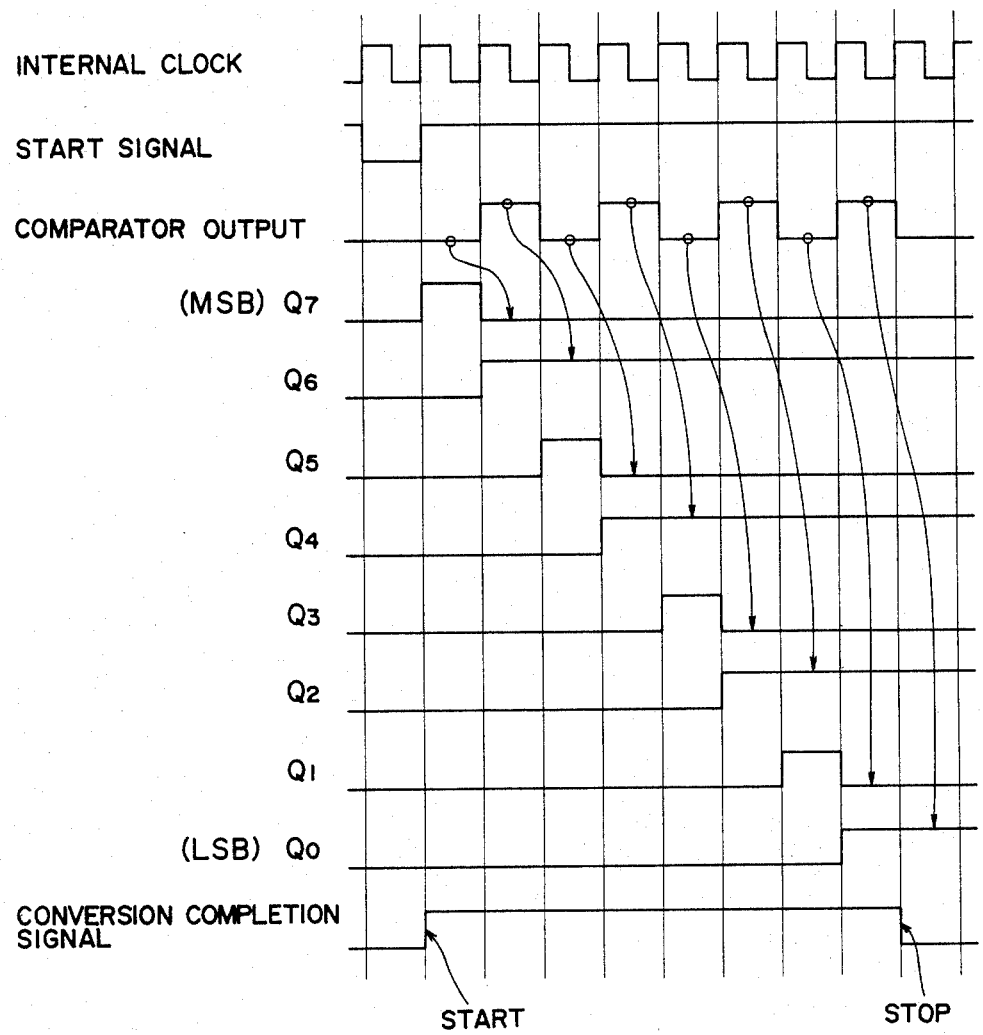

On the other hand, the control circuit 14 starts to operate upon receipt of the sample hold signal delivered by the sample hold timing circuit 9. As the first step, the analog switch of MSB in the D/A converter 11 is turned on. In consequence, the D/A converter 11 delivers the output signal $V_Y$, and a calculation $V_0 = V_X \cdot V_Y$ is conducted by the operation circuit 12 using one $V_X$ of the signals constituting the shading waveform held and outputted by the sample hold circuit 10. This signal $V_0$ is compared with the reference voltage $V_R$ in the comparator 13. The comparator 13 produces an output of H level when the reference voltage $V_R$ is higher than the calculated voltage $V_0$ and an output of L level when the refeference voltage is lower than the calculated voltage. The control circuit 14 keeps the analog switch in the present state when the output from the comparator 13 takes the H level and proceeds the step to the next bit. If the output from the comparator 13 takes the L level, the control circuit 14 proceeds the step to the next bit after turning the switch off. This operation is continued down to the LSB, and the states of the switches are stored in the memory circuit 15. This operation is conducted in synchronization with the internal clock of the control circuit 14 at timing as shown in FIG. 7. In the illustrated embodiment, the D/A converter 11 has a resolution constituted by 8 bits. The start signal is formed from the sample hold signal and the operation is started. The analog switch $Q_7$ (MSB) is turned on by the next clock and, by the subsequent clock, the output of the comparator 13 is set as indicated by an arrow. Simultaneously, the analog switch $Q_6$ is turned on. This operation is repeated down to the analog switch $Q_0$. Then, a conversion completion signal is issued and, upon receipt of this signal, the shading correction coefficient reading timing circuit 16 sets the addresses in the memory circuit 15, so that the states of analog switches, i.e. the shading correction coefficients, are stored in the memory circuit 15. Note that the analog switch takes the on state and off state, respectively, when the Q takes the H level and L level, respectively. This operation is repeated in accordance with the sample hold signal. The number of operations for calculation of the shading correction coefficient is set by the sample hold timing circuit 9. The storing of the shading correction coefficients is thus completed.

Hereinunder, an explanation will be made as to the shading correction during reading of the document.

All of the switches $S_1$ to $S_4$ are turned from the contacts (a) to the contacts (b) by the stop signal issued from the control circuit shown in FIG. 6b at a moment $t_1$ of completion of the memorization of shading correction coefficient storing operation. Then, before the next start signal is produced at the moment $t_2$, the data concerning two shading correction coefficients are read out of the memory circuit and interpolator operation is conducted with these coefficients in the interpolator circuit 18. The interpolator operation will be described in detail with specific reference to FIG. 8 showing the detail of the interpolator circuit 18. The first group A of data is held by a latch 20, while the second group B of data is held by a latch 21. The operation section 22 calculates the difference (A−B) between the groups A and B of data. This value is delivered to a division circuit 23 in which the variation ΔV is determined as follows, in accordance with the number (n) of the picture elements between two adjacent sampled picture elements.

$$\Delta V = (A-B)/(n+1)$$

These operations are performed in series in the period between the moment $t_1$ and $t_2$.

Then, at the moment $t_2$ of start of reading of the document, the switch $S_5$ is turned on to connect to the contact (a), and the latch 26 delivers the value of the data A to the D/A converter 11. In the next timing, the switch $S_5$ is turned to connect to the contact (b) and, at the same time, the latch 24 holds the value $\Delta V_1$ and the operation section 25 performs the calculation in accordance with a formula $A - \Delta V_1$. The calculated value is held by a latch 26 and is delivered to the D/A converter 11. Consequently, the next calculation made in the operation section 25 is conducted in accordance with a formula $(A - \Delta V_1) - \Delta V_1$. The calculated value is held by the latch 26 and is delivered to the D/A converter 11. Then, a next operation is made in accordance with a formula $(A - 2\Delta V_1) - \Delta V_1$. The calculated value is then delivered to the D/A converter 11. Thereafter, the same operation is repeated n times in synchronism with the driving clock of the control circuit 8. The above-described operation is conducted at timings in accordance with the timing signals given by the interpolator timing circuit 19.

As the variation $\Delta V_1$ is held by the latch 24, subsequent two shading correction coefficients are read out from the memory circuit 15, and the second or subsequent variation $\Delta V_2$ is determined in the same procedure as the determination of the first variation $\Delta V_1$. By conducting the calculation of the variation $\Delta V_1$ and the calculation of $\Delta V_2$ in a parallel manner, it is possible to shorten the time length of the processing performed by the interpolator circuit 18.

The shading correction coefficient issued from the interpolator circuit 18 is converted into analog signal by the D/A converter 11. This analog signal is then delivered to the operation circuit 12 where it is processed with the document signal $V_X$ issued from the sample hold circuit 10, and is outputted as the signal $V_0$ after the correction.

In the above-explained correcting operation, the curve C of the shading correction coefficients shown in FIG. 2 involves two sections at both side portions thereof, i.e. a section of A>B and a section of A<B. Therefore, the interpolator timing circuit 19 effects a switching of the content of calculation such that the operation section 22 performs the calculation B−A while the operation section 25 performs the calculation of A+ΔV.

It is possible to perfectly correct the shading by conducting the above-described shading correcting operation for each of the scanning cycle.

In the above-described embodiment of the invention, the sampling is made at a constant interval. The constant sampling interval, however, is not exclusive and it is possible to suitably vary the sampling interval such that the interval is rather coarse at the central region of the shading waveform and rather fine at both end regions. It is possible further enhance the accuracy by arranging such that the correction coefficient is obtained at each picture element at each end region of the shading waveform or the correction coefficient is determined specifically for the abnormal picture element. The accuracy of correction is limited by the nature of the circuit which performs the processing after the correction. For instance, when the intermediate tone is expressed by a method called Dither method, the limit of accuracy of correction is determined by the size of the matrix. In the described embodiment, the uniform reflecting surface is constituted by a white reflecting surface which is provided out of the picture of the document. This, however, is not exclusive.

As has been described, according to the invention, shading correction coefficients are calculated in accordance with a given formula from the light informations coming from the uniform reflecting surface and are memorized in advance to the reading of the original image, and a shading correcting operation for correcting the picture signal is made during reading of the document image by an interpolator using the above-mentioned shading correction coefficients. It is, therefore, possible to accurately correct the shading attributable to any fluctuation of light distribution characteristics of the lamp due to secular change, temperature change or the like, as well as the lack of uniformity in the sensitivity of the image sensor, thereby to ensure a higher quality of the reproduced image.

The present invention is effective particularly when the recording is made at an intermediate tone.

Furthermore, the invention permits a higher speed of the reading of document and, hence, a higher speed of recording, thanks to the use of the interpolator.

Figure 9:
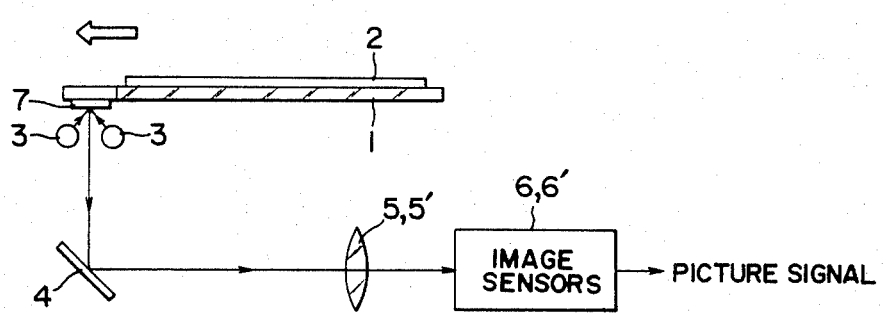
FIG. 9 is an illustration of another example of the document reading apparatus.

FIG. 9 shows an essential part of a document reading apparatus of movable document glass plate type, in accordance with another embodiment of the invention. This device has a document glass plate 1 on which a document 2 which is illuminated by lamps 3 is placed. The light reflected by the document is applied to image sensors 6, 6' through a reflecting mirror 4 and image forming lenses 5, 5' to form a picture signal. A white reflecting surface 7 is provided in the non-image area on the front part of the document glass plate 1. The lenses 5, 5' and the image sensors 6, 6' are arranged in pairs and disposed in the direction perpendicular to the sheet of FIG. 9. In this embodiment, two image sensors 6, 6' are used to permit the reading of the document at a high resolution. For instance, for reading an A-4 size document at a resolution of 16 dot/mm, the photoelectric conversion element has to have more than 3360 picture elements, as will be seen from the calculation of 210 mm×16 dot/mm. It is extremely difficult to obtain a single image sensor having such a large number of picture elements. The above-mentioned resolution, however, can easily be realized by the use of two image sensors each having 2048 picture elements. The scanning is conducted by moving the document glass plate in the direction of the arrow.

Figure 10:
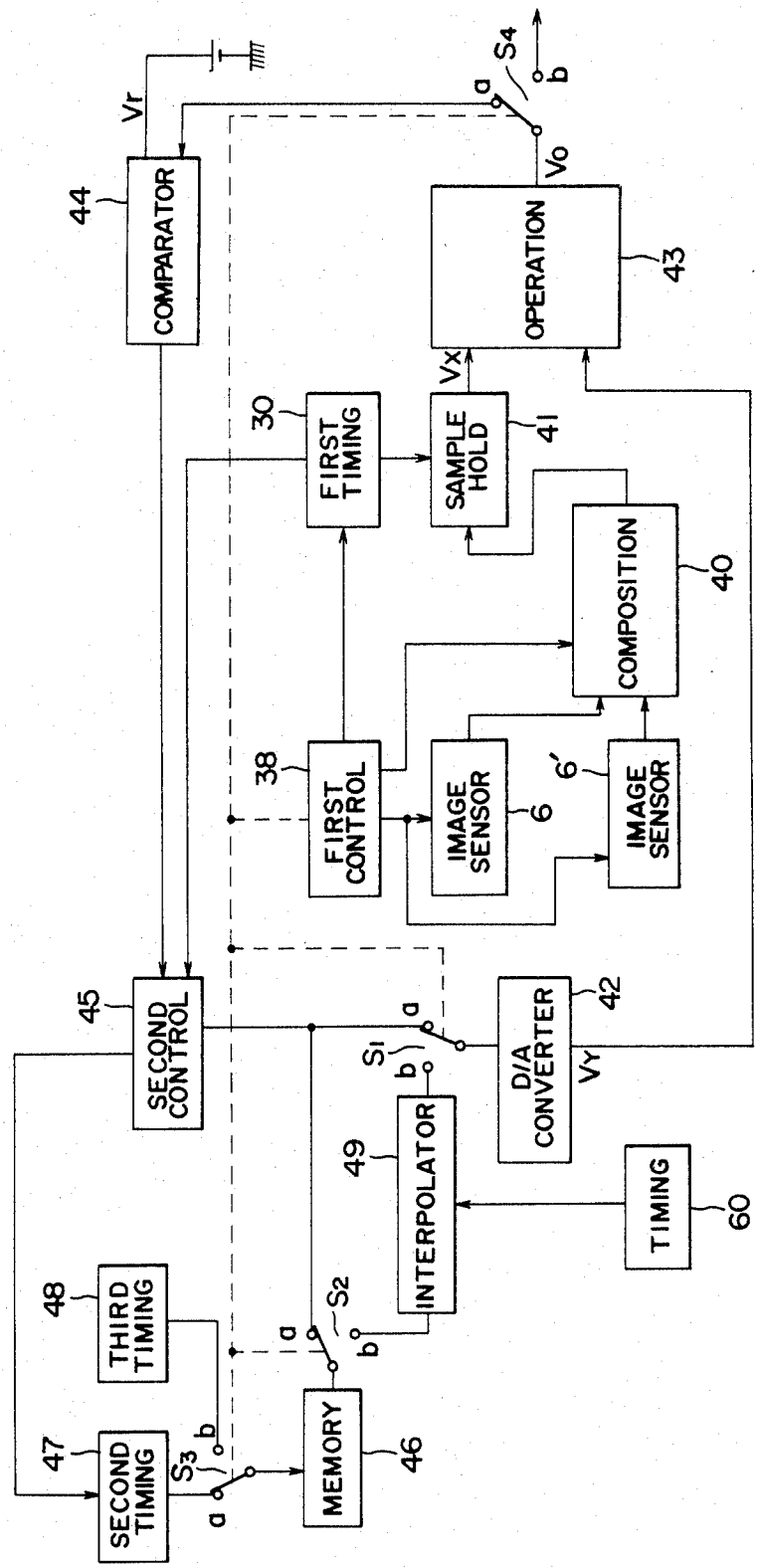
FIG. 10 is a circuit diagram of another embodiment of the invention.

FIG. 10 is a block diagram of a shading correction device in accordance with another embodiment of the invention, applied to the above-mentioned reading apparatus of the invention. Referring to FIG. 10, a first control circuit 38 is adapted to produce driving clocks for the image sensors 6, 6', signal for composing the outputs of the image sensors 6, 6' and signals for starting and stopping the photoelectric conversion. A first timing circuit 39 is adapted to set, in accordance with the driving clock delivered by the first control circuit 38, the timing of sampling of the output from the image sensors 6, 6' during scanning of the white reflecting surface. A reference numeral 40 denotes a composition circuit which composes the output picture signals from the sensors 6, 6' at a composition timing which is given by the first control circuit 38. A sample hold circuit 41 is adapted to sample hold the output picture signal from the composition circuit 40 in accordance with the output signal from the first timing circuit 39. A D/A converter for converting a digital input to analog output is denoted by a reference numeral 42. An operation processing circuit 43 is adapted to make a predetermined operation with the output picture signal $V_X$ from the sample hold circuit 41 and the output $V_Y$ from the D/A converter 42. A comparator 44 makes a comparison between a reference voltage $V_r$ and the output $V_o$ from the operation processing circuit 43. A second control circuit 45, which is adapted to be started by the output from the first timing circuit 39, is adapted to set every bits from MSB to LSB of the D/A converter 42 in accordance with the output from the comparator 44. A reference numeral 46 designates a memory element such as RAM in which the digital inputs to the D/A converter 42 set by the second control circuit 45 are successively stored. A reference numeral 47 designates a second timing circuit which produces timing signals for determining the timing of storage of the signals in the memory element 46. A third timing circuit 48 is adapted to produce timing signals for determining the timing of reading of the content in the memory element 46. An interpolator circuit 49 makes an interpolator operation to determine the shading correction coefficients of non-sampled picture elements using the data concerning the shading correction coefficients of the sampled picture elements. A reference numeral 60 denotes an interpolator timing circuit which is adapted to set the timing of calculation and delivery of the shading correction coefficients in the interpolator circuit 49. Switches $S_1$, $S_2$, $S_3$ and $S_4$ are switchable in accordance with a switching signal from the first control circuit 38, between contacts (a) for storage of the shading correction coefficients and contacts (b) for the reading of the document.

The shading correction device of this embodiment having the construction heretofore described operates in a manner explained hereinunder.

Referring first to the operation for storing the shading correction coefficients, switches $S_1$ to $S_4$ have been switched to connect to the contacts (a). The first timing circuit 30 produces, as in the case of the first embodiment, a sample hold signal as shown in FIG. 6c, in accordance with the driving clock (FIG. 6a) for the image sensors 6, 6', as well as the start/stop signal (see FIG. 6b) for the photoelectric conversion.

Figure 11:
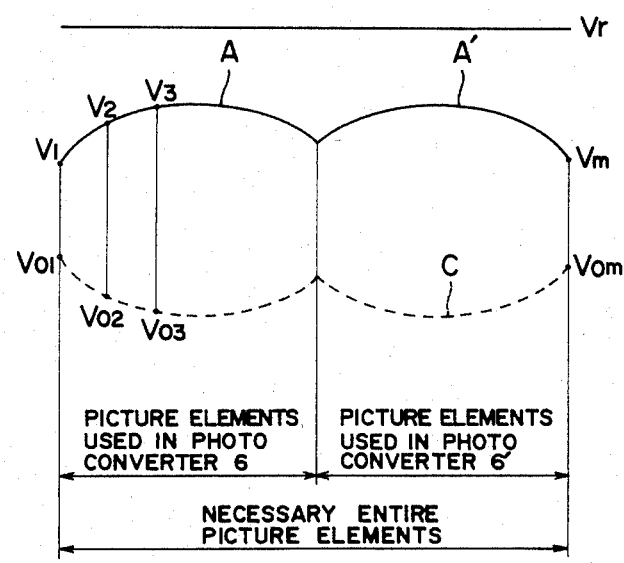
FIG. 11 is an illustration of shading waveforms and shading correction coefficients.

On the other hand, the composition circuit 40 composes a series of signals as a shading waveform from the signals obtained from the outputs from the image sensors 6, 6', i.e. by the photoelectric conversion of the white reflecting surface 7, and delivers the same to the sample hold circuit 41. More specifically, signals of waveforms shown by A, A' in FIG. 11 are obtained as the outputs from the image sensors 6, 6. The curves A, A' partly overlap each other but the output from the composition circuit 40 form one continuous signal as shown by solid line in FIG. 11.

The sample hold circuit 41 samples this shading waveform produced by the composition circuit 40, when the sample hold signal takes the L level, and holds the same when the sample hold signal takes the H level and delivers the same to the operation circuit 43. The sampling interval and the timing of switching from the sensor 6 to the sensor 6' during the composition are determined beforehand to satisfy the following requisites.

(1) The number of the picture elements used during the composition with the image sensor 6 and the number of the picture elements used in the composition with the image sensor 6' must be multiples of the sampling interval or pitch.

(2) the sum of the number of the picture elements used in the composition with the image sensor 6 and the number of the picture elements used in the composition with the image sensor 6' must be greater than the total number of required picture elements.

Assuming here that an A-4 size document (210 mm long) is read at a resolution of 16 dot/mm (total number of required picture elements being 3360) with two image sensors each having 2048 picture elements and that the sampling interval or pitch is 1/64 (one sampling in every 64 picture elements), the following two cases (1) and (2) are conceivable as meeting the aforementioned requisites.

(1) 2048 (64×32) picture elements of one of the image sensors 6, 6' and 1344 (64×21) picture elements of the other.

(2) 1644 (64×26) picture elements of one of the image sensors 6, 6' and 1728 (64×27) picture elements of the other.

The setting (2) mentioned above can provide a small gradient of the shading to permit a better correction rate by the correction through sampling, because the signals of the central region are used.

The control circuit 45 starts to operate in synchronism with the above-mentioned sample hold signal. At first, the MSB of the D/A converter 42 is turned on. In consequence, a signal $\frac{1}{2}$FS (full scale) is outputted from the D/A converter 42. Then, the operation circuit 43 makes a calculation in accordance with the formula $V_0 = V_1 \cdot V_Y$ using the above-mentioned signal $V_Y$ and the first sample value $V_X = V_1$ (see FIG. 11) of the shading waveform held in the sample hold circuit 41. This output $V_0$ is compared with the reference voltage Vr in the comparator 44. The comparator 44 produces an output of H level when the reference voltage Vr is higher than the output $V_0$ and an output of L level when the reference voltage Vr is lower than the calculated value $V_0$. The control circuit 45 proceeds the control to the subordinate bit without changing the state of MSB when the output from the comparator 44 takes the H level. To the contrary, when the output from the comparator 44 takes the L level, the control circuit 45 proceeds the control to the subordinate bit after turning off the MSB. The same operation is conducted down to the LSB.

This operation is conducted in synchronization with the internal clock of the second control circuit 45. An example of time chart of this control is shown in FIG. 7. In this case, it is assumed that the D/A converter 42 has a resolution of 8 bits. The starting signal is formed from the sample hold signal. As the setting is completed for switches from MSB down to LSB, the second control circuit 45 delivers a conversion completion signal to the second timing circuit 47. As a result, the second timing circuit 47 writes the set digital output from the second timing circuit 47 in the memory element 46. The above-described operation is repeated in accordance with the sample hold signal by a number equal to the number of samples (m in $Vx = V_1$ to Vm), as will be seen from FIG. 11.

In the above-described operation, the digital setting is made in such a manner as to meet the condition of Vr=Vo, i.e. $Vx \cdot Vy = Vr$ = constant.

Therefore, Vy is the shading coefficient itself and coincides with the curve C shown in FIG. 11. Thus, the memory element 46 stores shading correction coefficients for all picture elements.

An explanation will be made hereinunder as to the operation during reading of the document, i.e. the shading correction operation.

At a moment $t_1$, the switches $S_1$ to $S_4$ are switched from the contacts (a) to the contacts (b) in response to the stop signal (see FIG. 6b) from the control circuit 38. Then, before the next start signal is issued at a moment $t_2$, the data $V_{01}$ and $V_{02}$ concerning the shading correction coefficients at the first and second sampling points are read out of the memory element 46 and the operation is performed by the interpolator circuit 49 using these data. The method of interpolator is substantially identical to that explained before in connection with FIG. 8. More specifically, the first data $V_{01}$ is held by the latch 20 and then the second data $V_{02}$ is held by the latch 21. As to the data $V_{01}$ and $V_{02}$ a reference shall be made to FIGS. 11 and 12. The operation section 22 calculates the difference $(V_{01} - V_{02})$ between the data $V_{01}$ and $V_{02}$. The next division circuit 23 conducts a calculation for determining the variation $\Delta V_1$ between adjacent picture elements on the basis of the number (n) of the non-sampled picture elements between two adjacent sampled picture elements, in accordance with the following formula.

$$\Delta V_1 = (V_{01} - V_{02})/(n+1)$$

These operations in series are conducted in the period between the moments $t_1$ and $t_2$. At the moment $t_2$ of start of the reading of document, the switch $S_5$ has been switched to connect to the contact (a), while the latch 26 holds the data $V_{01}$. Therefore, the D/A converter 42 receives the first data $V_{01}$. In the next timing, the switch $S_5$ is turned to connect to the contact (b) and, at the same time, the variation $\Delta V_1$ is held by the latch 24 and the operation section 25 delivers an output signal $V_{01} - \Delta V_1$. The latch 26 holds this output and delivers the same to the D/A converter 42. As a result of the renewal of the content of the latch 26, the operation section 25 performs a new calculation in accordance with the following formula.

$$(V_{01} - \Delta V_1) - \Delta V_1 = V_{01} - 2\Delta V_1$$

The latch 26 again holds this calculation result, and delivers the same to the D/A converter 42. Then, an operation is made in accordance with the following formula.

$$(V_{01} - 2\Delta V_1) - \Delta V_{01} - 3\Delta V_1$$

The result of this operation is delivered to the D/A converter 42. Similar operation is repeated in synchronization with the driving clock from the second control circuit 38, and the results are delivered to the D/A converter 42. The above-described interpolator operation is performed by timing signals from the interpolator timing circuit 60.

At the moment at which the variation $\Delta V_1$ is held by the latch 24, two correction coefficient data necessary for the next interpolator operation are read from the memory element 46, and the second variation $\Delta V_2$ is determined by the same process as the variation $\Delta V_1$. parallel processing of the variation $\Delta V_1$ and the variation $\Delta V_2$ is made for shortening the time of processing performed by the interpolator circuit 49. In consequence, the interpolator by the newly calculated variation can be made in a faster manner.

The shading correction coefficient outputted from the interpolator circuit through the above-described operation is turned into analog signal by the D/A converter 42. Then, the operation circuit 43 makes an operation with the analog signal outputted from the D/A converter 42 and the document signal Vx outputted from the sample hold circuit 40, and the result of the operation is outputted as the corrected picture signal $V_0$.

In the above-described correcting operation, when two image sensors are used as shown by C in FIG. 11, representing the shading correction coefficient of adjacent sampled picture elements by $VK_1$ and $VK_2$, respectively, the relative magnitude between these signals is varied depending on the position as $VK_1 > VK_2$, $VK_1 < VK_2$, $VK_1 > VK_2$ and $VK_1 < VK_2$. Therefore, in the the region of $VK_1 < VK_2$, the operation section performs a calculation of $VK_2 - VK_1$ while the operation section 25 performs a calculation of $VK_1 + \Delta V$. The switching of the content of calculation is performed by the timing circuit 60.

By effecting this shading correction for each scanning, it is possible to perfectly eliminate the shading even when a plurality of image sensors are used to improve the resolution. In addition, since the shading correction coefficients are obtained not for all of the picture elements but only for selected picture elements at a predetermined sampling interval or pitch, the processing time is shortened remarkably to permit a high-speed reading as compared with the method in which the correction coefficients are determined for all picture elements.

In the described embodiment, the sampling interval in the determination of the shading correction coefficients is selected to be 1/64 (one sampling for every 64 picture elements). The sampling interval, however, need not always be constant and may be varied suitably in accordance with the amount of change of the shading waveform or in accordance with the resolution of the reading of document.

The accuracy of the shading correction can be further enhanced by determining the correction coefficient specifically for the abnormal picture element.

Figures 12, 13:
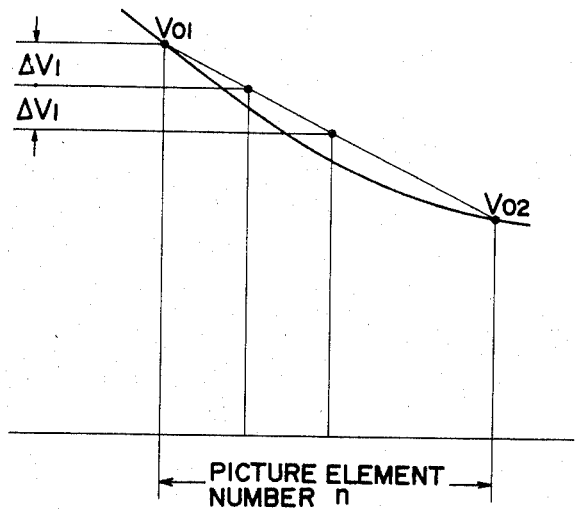
FIG. 12 is an illustration of an interpolator method for calculating the shading correction coefficients.
FIG. 13 is an example of the matrix.
Figure 14:
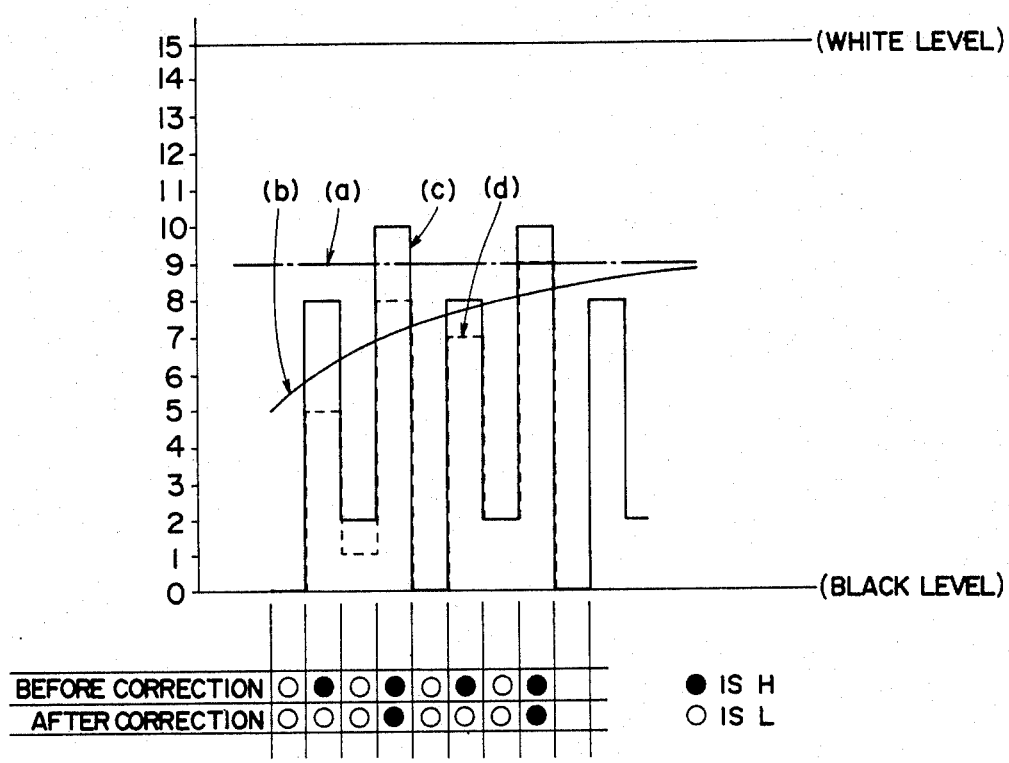
FIG. 14 shows a relationship between the Dither matrix and the input/output of the picture.

In the described embodiment, the content of the operation is a multiplication and the image signal is directly corrected. This, however, is not exclusive. For instance, if the socalled Dither method is used, the shading correction in accordance with the invention may be made by correcting the Dither threshold value. For example, if a 4×4 matrix as shown in FIG. 13 is used as the Dither matrix, a relationship as shown in FIG. 14 is obtained between the Dither matrix and the input/output of the picture. More specifically, when the image of a uniform density is taken, although a constant value (a) is obtained theoretically, the actual output is deformed as (b) due to a shading. In order to obviate the influence of the shading, it is necessary to correct the Dither threshold value from solid line (c) to broken line (d) for each scanning, in accordance with the shading waveform. By effecting such a correction, a condition as shown in Table attached to the lower part of FIG. 14 is obtained, so that the same effect is produced as that produced by correcting the image signal (b) to (a).

The correction of the Dither threshold value is conducted in a manner explained hereinbelow.

Figure 15:
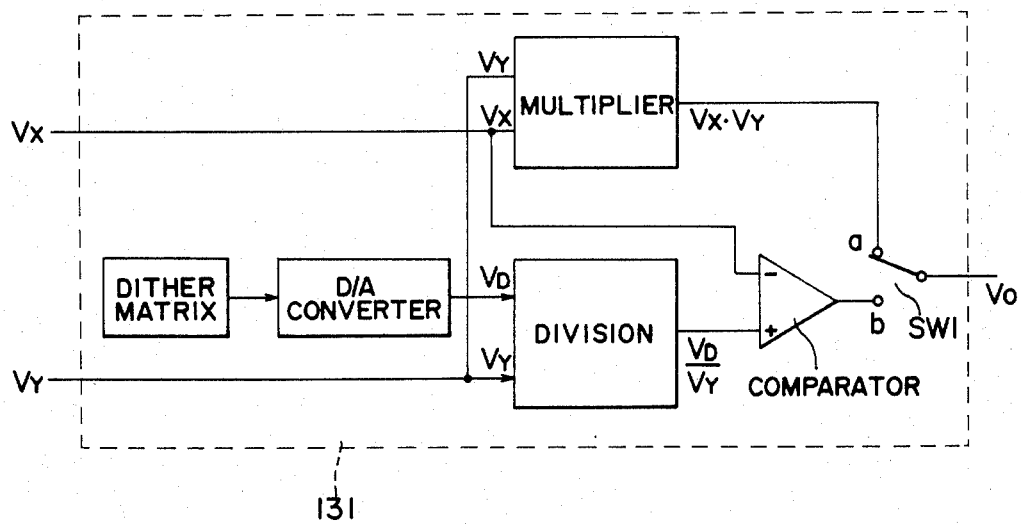
FIG. 15 is an operation circuit of the other embodiment of the invention.

Dither threshold value/shading correction coefficient = Dither threshold value after correction The operation circuit can be modified as shown in FIG. 15. The switch $SW_1$ is turned to connect to the (a) contact during determination of the shading correction coefficient, and is connected to (b) contact during the Dither processing. By incorporating the D/A converter for shading correction coeffient and the operation circuit, it is possible to correct the Dither threshold value digitally.

The limit of correction accuracy depends on the circuit for processing after the correction. For instance, when the intermediate tone is expressed by Dither method, the correction accuracy is determined by the size of the matrix.

Although the uniform reflecting surface in the described embodiment is a white reflecting surface provided at the nonimage region, this is not exclusive.

The sampling need not be essentially made at picture elements on the point of composition but also made to select picture elements in the vicinity of the point of composition.

As has been described, according to the invention, it is possible to accurately determine the shading correction coefficient even when a plurality of image sensors are used. In consequence, the quality of picture is improved through adequate shading correction. The described embodiment, therefore, can suitably be used particularly when the reading is made at a high resolution.

Figure 16:
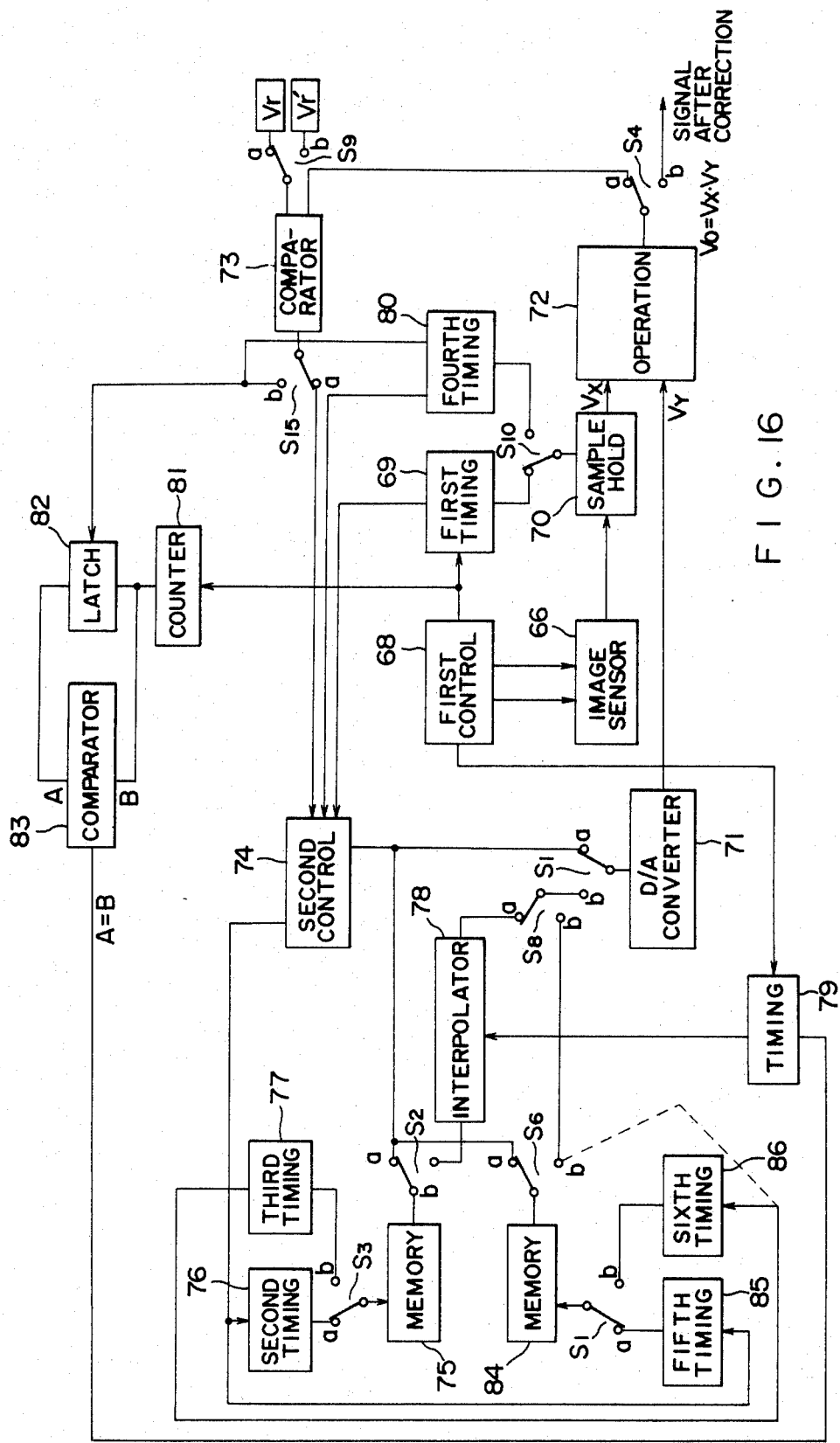
FIG. 16 is a circuit diagram of still another embodiment of the invention.

FIG. 16 is a block diagram of a shading correction device in accordance with still another embodiment of the invention. A first control circuit 68 is adapted to produce driving clock for the image sensor 6 and start/-stop signal for photoelectric conversion. A first timing circuit 69 is adapted to set the timing of sampling of the output from the image sensor 6 during scanning of a white reflecting surface 7, in accordance with the driving clock outputted from the first control circuit 68. A sample hold circuit 70 is adapted to make a sample hold of output picture signal from the image sensor 6 in accordance with the output signal from the first timing circuit 69 or from a later-mentioned fourth timing circuit 80. A reference numeral 71 designates a D/A converter for converting a digital input to an analog output. An operation circuit 72 is adapted to make a predetermined calculation or operation using the output picture signal $V_X$ from the sample hold circuit 70 and and the output $V_Y$ from the D/A converter 71. A reference numeral 73 designates a comparator adapted to compare the output $V_0$ from the operation circuit 72 with a reference voltage Vr or Vr'. A reference numeral 74 designates a second control circuit which is adapted to start to operate by the output from the first timing circuit 69 or a later-mentioned fourth timing circuit 80 so as to set the bits of the D/A converter 71 from MSB to LSB in accordance with the output from the comparator 73. A reference numeral 75 denotes a memory element such as RAM in which the digital inputs to the D/A converter 71 set by the second control circuit 74 are written successively. A second timing circuit is adapted to produce a timing signal determining the timing of writing in the memory element 75. A third timing circuit 77 is adapted to produce a timing signal which determines the timing of reading out of the memory element 75. An interpolator 78 is adapted to make an interpolator operation to determine the shading correction coefficients of non-sampled picture elements from the shading correction coefficients for the sampled picture elements.

A reference numeral 79 denotes a interpolator timing circuit adapted for setting the timing of operation for determining the shading correction coefficient in the interpolator 78, as well as the timing of delivery of the shading correction coefficient. A reference numeral 80 denotes a fourth timing circuit for delivering to the sample hold circuit a signal for holding the signal of the abnormal picture element for a time length longer than the processing time. A reference numeral 81 denotes a counter for counting the driving clock from the first control circuit 68. A latch 82 is adapted to temporarily store the content of the counter 81 upon receipt of the signal from the comparator 73. A comparator 83 is adapted to judge whether the content of the counter 81 is equal to the value of the latch 82. A memory element 84 is adapted to store the shading correction coefficient obtained with the abnormal picture element. A reference numeral 85 denotes a fifth timing circuit adapted to produce a timing signal for setting the time of writing in the memory element 84. A reference numeral 86 denotes a sixth timing circuit adapted to deliver the timing signal for setting the timing of reading from the memory element 84. Switches $S_1$ to $S_{10}$ are adapted to be switched by the first control circuit 68.

The shading correction device having the described construction operates in a manner explained hereinunder. Referring first to the operation for storing the shading correction coefficient, switches $S_1$ to $S_{10}$ have been switches to connect to the contacts (a). A first timing circuit 69 produces a sample hold signal as shown in FIG. 6c, in accordance with the driving clock (FIG. 6a) for the image sensor 6 issued from the first control circuit 68 and the photoelectric conversion start/stop signal (FIG. 6b). The sample hold circuit 70 samples and holds the shading waveform given by the image sensor 6 when the sample hold signal takes L level and H level, respectively. When the sample hold signal takes the H level, the shading waveform is delivered to the operation circuit 72. The second control circuit 74 starts to operate in synchronization with the sample hold signal. Firstly, the MSB of the D/A converter 71 is turned on, so that the D/A converter 71 produces a signal Vy of 178 FS (full scale). Then, the operation circuit 72 performs an operation of $V_0 = V_1 \cdot V_y$, using the above-mentioned signal Vy and the first sample value $V_x = V_1$ of the shading waveform stored in the sample hold circuit 70. This output $V_0$ is compared by the comparator 73 with the reference voltage Vr. The comparator 73 produces an output which takes H level and L level, respectively, when the reference voltage Vr is higher and lower than the calculated value $V_0$. When the output takes the H level, the control circuit 74 proceeds the process to the next bit without changing the state of MSB. To the contrary, when the output takes the L level, the process is advanced to the next bit after turning the MSB off. Similar operation is continued down to LSB, and the set digital output of the second control circuit 74 is written in the memory element 75. This operation is conducted in synchronization with the internal clock of the second control circuit 74 in accordance with a timing chart which may be, for example, the same one as that shown in FIG. 5. It is assumed that the D/A converter has a resolution of 8 bits. The start signal is formed from the sample hold signal. As the setting is finished for all switches starting with the MSB and ending with the LSB, the second control circuit 74 delivers a conversion completion signal to the second timing circuit 76. In consequence, the second timing circuit 76 writes the set digital output of the second control circuit 74 in the memory element 75. This operation is repeated in accordance with the sample hold signal, by a number equal to the number of the sampling (m in $V_x = V_1$ to $V_m$) (see FIG. 1).

The digital setting in the above-described operation is made to satisfy the following conditions.

$Vr = V_0$ $Vx \cdot Vy = Vr = $ constant

Figure 1:
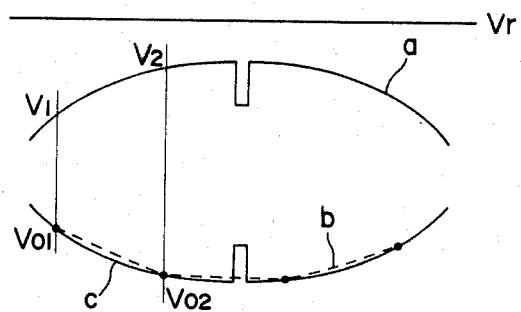
FIG. 1 is an illustration of shading waveforms and shading correction coefficients.

Therefore, the Vy is the shading correction coefficient itself and constitutes the curve (b) in FIG. 1. Thus, the memory element 75 stores the shading correction coefficients of all sampled picture elements.

As the storage of the shading correction coefficients for all sampled picture elements is finished, the switches $S_1$, $S_2$, $S_3$, $S_5$, $S_9$ and $S_{10}$ are turned to connect to the contact (b) to make the detection of abnormal picture element. This detection is made while determining the shading correction coefficients of non-sampled picture elements by means of the interpolator 78. More specifically, two data of shading correction coefficients are read out of the memory element 75, and the interpolator 78 performs an interpolator with these two data, in the same manner as that described before in connection with FIG. 8. Namely, the first data $V_{01}$ out of two data concerning the correction coefficients is held by the latch 20, while the other data $V_{02}$ is held by the latch 21. As to the nature of the data $V_{01}$ and $V_{02}$, a reference shall be made to FIGS. 1 and 12. The operation section 22 calculates the difference $(V_{01} - V_{02})$ between two data $V_{01}$ and $V_{02}$ and the division circuit which receives the different makes a calculation to determine the variation between adjacent picture elements in accordance with the number (n) of non-sampled picture elements as follows.

$\Delta V_1 = (V_{01} - V_{02})/(n+1)$.

This series of operation is performed on the period between the moment $t_1$ and the moment $t_2$.

At the moment $t_2$ at which the reading of the reflecting surface 7 for the detection of abnormal picture element, the switch $S_5$ is turned to connect to the contact (a), and the data $V_{01}$ is held by the latch 26 and delivered to the D/A converter 71. In the next timing, the switch $S_5$ is turned to connect to the contact (b) and, at the same time, the latch 24 holds the variation $\Delta V_1$, while the operation section 25 outputs the value $V_{01} - \Delta V_1$. The latch 26 holds this value and delivers the same to the D/A converter 71. As a result of the renewal of the content of the latch 26 the operation section 25 makes a new calculation in accordance with the following formula.

$(V_{01} - \Delta V_1) - \Delta V_1 = V_{01} - 2\Delta V_1$.

The latch 26 holds the calculation results and delivers the same to the D/A converter 71 again. As a result, a next calculation is made in the operation section 36 as follows.

$$(V_{01}-2\Delta V_1)-\Delta V_1=V_{01}-3\Delta V_1.$$

The calculation result is delivered to the D/A converter 71. Then, the operation is repeated in the same manner in synchronism with the driving clock produced by the second control circuit 74, and the calculation result is delivered to the D/A converter 71. The above-explained interpolator operation is made in accordance with the timing signal from the interpolator timing circuit 79.

At the moment at which the variation $\Delta V_1$ is held by the latch 24, two data necessary for the next interpolator operation are read out of the memory element 75. With these data, the next variation $\Delta V_2$ is determined in the same manner as that for the determination of the variation $\Delta V_1$. The parallel operation for determination of two variations $\Delta V_1$ and $\Delta V_2$ is made for shortening the time of operation performed by the interpolator 78. In consequence, the time length of the interpolator conducted with the newly calculated variation is also shortened.

When the above-described interpolator operation is made, representing the adajacent sample values of shading correction coefficient by $VK_1$ and $VK_2$, the relation of magnitude between these two values vary as $VK_1 > VK_2$ and $VK_1 < VK_2$ depending on the position, as will be seen from C in FIG. 1. Therefore, in the region of $VK_1 < VK_2$, the content of operation is switched by the interpolator timing circuit 79 such that the operation section 22 calculates $VK_2 - VK_1$ while the operation section 25 calculates $VK_1 + \Delta V$.

The shading correction coefficients outputted from the interpolator 78 is changed into analog signal by the D/A converter 71. Then, the operation circuit 72 performs an operation using the analog signal and the reading signal Vx from the reflecting surface 7 issued by the sample hold circuit 70. The result of the operation is outputted as $V_0$. This corrected signal $V_0$ is compared with the reference voltage Vr' obtained from the allowance for the shading correction rate. Namely, the comparator 73 produces an output which takes H level when the reference voltage Vr' is higher than the calculated voltage $V_0$ and the content of the counter 81 in this state, i.e. the position of the abnormal picture element is held by the latch 82. Simultaneously, the timing circuit 80 produces a hold signal to make the sample hold circuit 70 hold the signal of the abnormal picture element. At the same time, the switches $S_1$, $S_5$ and $S_9$ are turned to connect to the contacts (a), and the control circuit 74 starts to operate to determine the shading correction coefficient for the abnormal picture element. This coefficient is written in the memory circuit 84 in accordance with the timing signal from the timing circuit 85. Then, the switches $S_1$, $S_{15}$ and $S_9$ are turned to connect to contacts (b) to continue the detection of abnormal picture elements.

After the completion of the detection of abnormal picture elements and the storage of the correction coefficients corresponding to the abnormal picture element, switches $S_1$, $S_4$, $S_6$ and $S_7$ are turned to connect to the contacts (b) while the switch $S_5$ is turned to connect to the contact (a) to perform the correction of the picture signal. This correcting operation resembles the operation for detecting the abnormal picture elements. Namely, the shading correction coefficent delivered by the interpolator 78 is changed into analog signal by the D/A converter 71. The operation circuit 72 conducts an operation using this analog signal and the document reading signal Vx issued from the sample hold circuit 70. The result of the operation is delivered as the signal $V_0$ after the correction. In this operation, when the comparator 83 detects that the content of the counter 81 is equal to the content of the latch 82 holding the position of the abnormal picture element, the switch $S_8$ is turned to connect to the contact (b), so that the correction coefficient corresponding to the abnormal picture element is read out from the memory circuit by the timing circuit 86. The read out coefficient is then delivered to the D/A converter 71 for the correction of the abnormal picture element. Then, the process is returned to the ordinary correction operation.

The shading is perfectly corrected by effecting the above-described correcting operation for each scanning.

Although in the described embodiment a constant sampling interval is adopted, the sampling interval may be varied such that the interval is fine at both end regions of the shading waveform and coarse at the central region of the same, in accordance with the shading waveform. The foregoing explanation is made on an assumption that there is only one abnormal picture element. If there are a plurality of abnormal picture elements, the correction coefficients of the abnormal picture elements are obtained by using a plurality of latches 82. If the abnormal picture element happened to be identical with one of the sampled picture elements, the position of the sampling is shifted by one pitch of picture elements.

In the described embodiment, a white reflecting surface is provided on the non-image section as the uniform reflecting surface. This, however, is not exclusive.

As has been described, according to the invention, it is possible to realize a shading correction device capable of performing the shading correction at a high speed even when a image sensor having abnormal picture element is used.

What is claimed is:

1. A shading correction device comprising: a reflecting portion having a uniform reflection factor distribution; a photoelectric conversion means for converting the light reflected by said reflecting surface into an electric signal; an operation means for calculating shading correction coefficients at a predetermined sampling timing from said electric signal derived from said photoelectric conversion means; a memory means for storing the shading correction coefficients calculated by said operation means; an interpolator means adapted to perform, using said shading correction coefficients read from said memory means, a calculation for determining the shading correction coefficient corresponding to a predetermined portion of said reflecting portion by an interpolator and to hold the calculated coefficient; a correcting means for effecting a shading correction of the picture signal representing the document information to be recorded by means of shading correction coefficients read out of said interpolator; and means operable while the correction is made by said shading correcting means derived from said interpolator, to cause the shading interpolator coefficients for the next sampling to be read out of said memory means and to cause the shading correction coefficients for non-sampling period to be calculated by said interpolator circuit.

2. A shading correction device according to claim 1, characterized in that, shading correction coefficients are calculated from electric signal derived from photoelectric conversion means and predetermined reference voltage.

3. A shading correction device according to claim 1 or 2, wherein different sampling intervals are used at the end regions and the central region of the main scanning.

4. A shading correction device comprising: a reflecting surface having a uniform reflecting factor; a plurality of image sensors to which the light reflected by said reflecting surface is introduced through respective image-forming lenses; means for sampling the outputs from said image sensors at a predetermined sampling timing; means for determining the shading correction coefficients for the sampled picture elements from the sampled values; and an interpolator means for determining the shading correction coefficients for all picture elements by an interpolator; wherein the picture elements on the point of composition of said image sensors or the picture elements in the vicinity of said point of composition are used as the sample points.

5. A shading correction device comprising: a reflecting surface having a uniform reflecting factor; an image sensor to which the light reflected from said reflecting surface is introduced through an image forming lens; means for sampling the outputs from said image sensors at a predetermind timing; means for determining the shading correction coefficients for the sampled picture elements from the sampled value; and means for determining the shading correction coefficients by interpolator for all picture elements used; wherein the shading correction coefficients for the sampled picture elements are determined by a first scanning of said reflecting surface, and the outputs from said image sensors obtained through a second scanning of said reflecting surface are corrected in accordance with the shading correction coefficient for each picture element used calculated by the interpolator, the corrected value being compared with a previously determined reference value to permit the detection of position of abnormal picture element, the shading correction coefficient for said abnormal picture element is obtained separately and, when the document is read, the correction of information concerning said abnormal picture element is corrected by the separately determined shading correction coefficient.

* * * * *